J. D. McCRIMMON.
IRRIGATING SYSTEM.
APPLICATION FILED JAN. 25, 1911.
998,253.
Patented July 18, 1911.
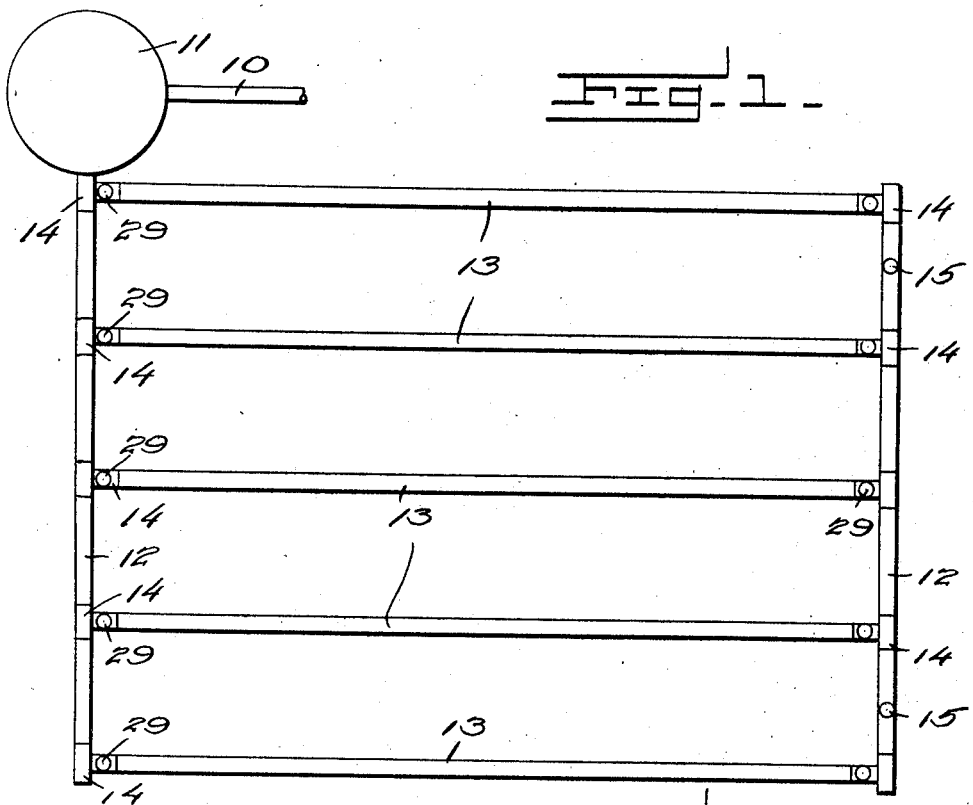
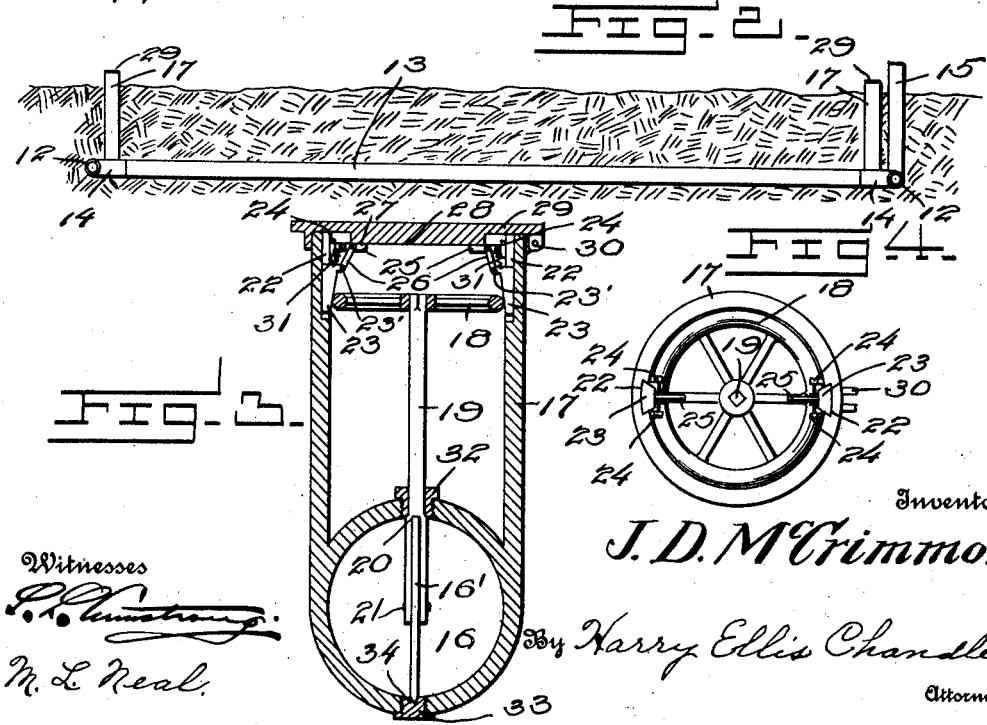
Witnesses
P. L. Armstrong
M. L. Neal
Inventor
J. D. McCrimmon,
By Harry Ellis Chandlee,
Attorney

UNITED STATES PATENT OFFICE.

JOHN D. McCRIMMON, OF CORSICANA, TEXAS.

IRRIGATING SYSTEM.

998,253.

Specification of Letters Patent. Patented July 18, 1911.

Application filed January 25, 1911. Serial No. 604,582.

*To all whom it may concern:*

Be it known that I, JOHN D. McCRIMMON, a citizen of the United States, residing at Corsicana, in the county of Navarro and State of Texas, have invented certain new and useful Improvements in Irrigating Systems, of which the following is a specification.

This invention relates to improvements in irrigating systems, and has for one of its objects to provide a device of this class which will thoroughly irrigate the soil at a sufficient distance below the surface to prevent freezing in winter, and to effectively moisten the same in the dry season.

Another object of the present invention resides in the means for locking the valves in any position desired.

Other objects and advantages will be apparent from the following description, it being understood that changes in the specific structure shown and described may be made within the scope of the claims without departing from the spirit of the invention.

In the accompanying drawings: Figure 1 is a top plan view of the system, Fig. 2 is a side elevation of the same, Fig. 3 is a vertical sectional view through one of the valves, Fig. 4 is a top plan view of the same, the cover being shown open.

Referring to the accompanying drawings, 10 represents a water supply, which may be fed therefrom by gravity, the tank 11 being on an elevation, or the water may be forced by a suitable pump, of the ordinary construction. (Not shown.)

The system of conductors, comprises the longitudinal pipes 12, to which are connected, and extend transversely therebetween, the lateral pipes 13. Where each of the laterals 13 join the longitudinals 12, are inserted the T's 14, in each of which is arranged a valve to be later described. The pipes 12 and 13, are formed of suitable proportions of sand and cement, to provide a reasonable amount of porosity, for the water to pass therethrough to the surrounding soil. At suitable points, as indicated at 15, iron pipes extend vertically from the pipes 12 and 13 to the surface of the soil to provide an overflow, when the pressure of water in the pipes is too great. The pipes 12 and 13 are laid in the soil below the frost line, to prevent freezing in winter, and when, in the dry season, the portion of the soil above that line would be very dry, water from these pipes will pass upwardly through the soil by capillary attraction.

In each of the T's is located a valve 16, so that the supply of water to each of the pipes 13 may be controlled. Connected to the T, and extending to the surface, is a box 17, having its upper end open, whereby access may be had to the hand wheel 18 on the upper end of the stem 19 of the valve. The lower end of this stem is bifurcated and straddles the blade 16' of the valve 16, as shown at 20, being secured thereto by any suitable means as the bolt 21. In the inner opposite faces of the box, and near the upper end are formed the vertical guide slots 22, in which are disposed the vertically moving tapering locking pins 23. On the same faces of the box, and a short distance above the slots 22, are secured the brackets 24, pivotally carrying the inwardly extending arms 25. Pivotally connected at their opposite ends to the arms 25, and the perforated ears 23' on the pins 23, are the links 26, which are adapted to raise and lower the said pins upon movement of the arms 25. On the free end of each of the arms 25 is a flat bearing surface 27, for engagement by the central enlargement 28, on the lower face of the cover 29, which is hinged to the box at 30. Coil springs 31, connected to the brackets 24 and the pins 23, normally hold the said pins in their upper position. It will thus be seen that when the cover is closed, the central enlargement 28 will bear on the arms 25 and force the pins 23 downwardly so that their inclined faces will wedge against the rim of the hand wheel 18.

The slots 22 are preferably dovetailed, to insure the proper vertical movement of the pins 23 therein. When the cover is raised, the springs 31 will raise the pins to permit the hand wheel being rotated. By this construction the valve 16 may be locked in open or closed position in any degree. The lower portion of the stem 19 passes through a metallic bushing 32, while in the lower part of the T is a metallic socket member 33, to receive the pivot pin 34 of the valve blade 16'.

From the foregoing it will readily be seen that I have provided an efficient irrigating system, whereby water is conducted to different portions of an area of ground, and being below the frost line freezing is prevented. Also the surface hardening of the soil in the dry season is eliminated. The construction and arrangement of the valves makes it possible to control the supply of water to any individual portion of the area. The locking means provides that the valves may be locked in any degree, open or closed.

What is claimed is:

1. The combination with a conduit of an irrigating system, of a box on said conduit, a valve in the conduit, a stem connected to the valve and extending into the box, a hand wheel on the stem, a cover for the box, and means controlled by the cover for locking said hand wheel when the cover is closed.

2. The combination with the conduit of an irrigating system, of a box on the conduit, a rotating valve in the conduit, a stem secured to the valve and extending upwardly into the box, a hand wheel on the stem, means in the box for locking the hand wheel, and means on the cover for actuating said locking means when the cover is closed.

3. The combination with a valve box, a stem in the box, a cover for the box, wedging members mounted to slide in the box, a handwheel on the stem adapted to be engaged by said wedging members and means connected with said wedging members for engagement by the said cover, whereby said wedging members are forced into engagement with the handwheel to lock the same when the cover is closed.

4. In combination with the handwheel of a valve, and valve box having a cover, of a locking means for said handwheel comprising brackets mounted in the valve box, arms pivoted to said brackets, tapering wedges mounted to slide vertically in dovetailed grooves in said valve box, links pivotally connecting the said arms and wedges, said wedges adapted to engage between the hand wheel and the box, and means on the cover for engagement with said arms, when said cover is closed, to force said wedges between the said wheel and box, and means for raising the wedges when the cover is opened.

In testimony whereof I affix my signature, in the presence of two witnesses.

JOHN D. McCRIMMON.

Witnesses:
P. C. TOWNSEND,
C. F. HEALY.

---

Copies of this patent may be obtained for five cents each, by addressing the "Commissioner of Patents, Washington, D. C."